US012781523B2

(12) United States Patent
Steinwandel et al.

(10) Patent No.: US 12,781,523 B2
(45) Date of Patent: Nov. 3, 2026

(54) METHOD FOR AUTOMATICALLY ADJUSTING A VARIABLE BOOM POSITION OF AN ADJUSTABLE DISTRIBUTOR BOOM OF A BUILDING MATERIAL PUMP APPARATUS AND/OR THICK MATTER PUMP APPARATUS, AND SYSTEM

(71) Applicant: Putzmeister Engineering GmbH, Aichtal (DE)

(72) Inventors: Alexander Steinwandel, Reutlingen (DE); Lukas Reiser, Denkendorf (DE)

(73) Assignee: Putzmeister Engineering GmbH, Aichtal (DE)

( * ) Notice: Subject to any disclaimer, the term of this patent is extended or adjusted under 35 U.S.C. 154(b) by 474 days.

(21) Appl. No.: 18/576,777

(22) PCT Filed: Jun. 29, 2022

(86) PCT No.: PCT/EP2022/067917
§ 371 (c)(1),
(2) Date: Jan. 5, 2024

(87) PCT Pub. No.: WO2023/280657
PCT Pub. Date: Jan. 12, 2023

(65) Prior Publication Data

US 2024/0287822 A1 Aug. 29, 2024

(30) Foreign Application Priority Data

Jul. 6, 2021 (DE) ..................... 10 2021 207 092.2

(51) Int. Cl.
*E04G 21/04* (2006.01)
*B66C 23/68* (2006.01)

(52) U.S. Cl.
CPC .......... *E04G 21/0463* (2013.01); *B66C 23/68* (2013.01); *E04G 21/0436* (2013.01)

(58) Field of Classification Search
CPC ..... E04G 21/04; E04G 21/0463; B66C 23/68; B66C 23/80
(Continued)

(56) References Cited

U.S. PATENT DOCUMENTS 6,871,667 B2 * 3/2005 Schwing ................ E04G 21/04 141/387
10,407,282 B2 * 9/2019 Henikl .................. B66C 13/066
(Continued)

FOREIGN PATENT DOCUMENTS

CN 106842954 A 6/2017
CN 108098777 A 6/2018
(Continued)

OTHER PUBLICATIONS

Chinese-language Office Action issued in Chinese Application No. 202280048184.1 dated Jan. 29, 2026 with English translation (16 pages).
(Continued)

*Primary Examiner* — Andrew Joseph Rudy
(74) *Attorney, Agent, or Firm* — Crowell & Moring LLP

(57) ABSTRACT

A method automatically adjusts a variable boom position of an adjustable distributor boom of a building material pump apparatus and/or thick matter pump apparatus. At least one same tip position of a boom tip of the distributor boom can be achieved by way of different boom positions. The method determines and adjusts a boom position depending on a predefined quantity in a manner which determines a tip position and on the basis of an optimization criterion, the optimization criterion being a minimized tilting moment of the distributor boom in relation to a support system of the building material pump apparatus and/or thick matter pump apparatus. The tilting moment depends on the boom position.

11 Claims, 3 Drawing Sheets

(58) Field of Classification Search
USPC .......................................................... 701/50
See application file for complete search history.

(56) References Cited

U.S. PATENT DOCUMENTS

| | | | |
|---|---|---|---|
| 11,365,551 B2 * | 6/2022 | Edler .................. | E04G 21/0463 |
| 2006/0137750 A1 | 6/2006 | Alwes et al. | |
| 2015/0112555 A1 | 4/2015 | Yi et al. | |
| 2017/0144635 A1 | 5/2017 | Mayer et al. | |
| 2019/0308592 A1 | 10/2019 | Sacken et al. | |

FOREIGN PATENT DOCUMENTS

| | | | |
|---|---|---|---|
| CN | 108326852 | A | 7/2018 |
| CN | 112157650 | A | 1/2021 |
| DE | 10 2008 017 961 | A1 | 10/2009 |
| DE | 10 2019 105 817 | A1 | 9/2020 |
| EP | 2 813 643 | A1 | 12/2014 |
| JP | 62-225661 | A | 10/1987 |
| JP | 4-92947 | U | 8/1992 |
| JP | 2002-195208 | A | 7/2002 |
| JP | 2007-506878 | A | 3/2007 |
| JP | 2017-530273 | A | 10/2017 |
| WO | WO 2018/115270 | A1 | 6/2018 |

OTHER PUBLICATIONS

International Search Report (PCT/ISA/210) issued in PCT Application No. PCT/EP2022/067917 dated Oct. 27, 2022 with English translation (4 pages).
German-language Written Opinion (PCT/ISA/237) issued in PCT Application No. PCT/EP2022/067917 dated Oct. 27, 2022 with English translation (8 pages).
Japanese-language Office Action issued in Japanese Application No. 2024-500269 dated Sep. 30, 2025 (2 pages).

* cited by examiner

VMS ↓
74.7% Minimization

VMS ↓
48.1% Minimization

VMS ↓
41.7% Minimization

VMS ↓
24.5% Minimization

METHOD FOR AUTOMATICALLY ADJUSTING A VARIABLE BOOM POSITION OF AN ADJUSTABLE DISTRIBUTOR BOOM OF A BUILDING MATERIAL PUMP APPARATUS AND/OR THICK MATTER PUMP APPARATUS, AND SYSTEM

FIELD OF APPLICATION

The invention relates to a method for automatically setting a variable boom position of an adjustable distributor boom of a building material pump apparatus and/or thick matter pump apparatus, and to a system.

BACKGROUND AND SUMMARY

The invention is based on the problem of providing a method for automatically setting a variable boom position of an adjustable distributor boom of a building material pump apparatus and/or thick matter pump apparatus, and a system, in particular in each case having improved properties.

The invention solves this problem by providing a method and a system with the features of the independent claims. Advantageous developments and/or refinements of the invention are described in the dependent claims.

The method according to the invention, which is in particular automatic, is designed or configured or provided for automatically setting a variable boom position of an, in particular flexibly, adjustable distributor boom of a building material pump apparatus and/or thick matter pump apparatus. At least one same tip position of a boom tip of the distributor boom can be achieved by different boom positions or boom poses, in particular of the distributor boom. The method comprises or has the step of: determining, in particular automatically determining, and setting, in particular automatically setting, a boom position, in particular at least one value of the boom position, in particular of the distributor boom, depending on a predefined variable or a parameter, in particular a value of the variable, ascertaining a tip position, in particular a value of the tip position, in particular of the boom tip, and on the basis of an, in particular at least one, optimization criterion. The optimization criterion is a minimized or reduced, in particular mechanical, tilting or load moment, in particular a minimized value of the tilting moment, of the distributor boom in relation to a support system, in particular the distributor boom, the building material pump apparatus and/or thick matter pump apparatus. The tilting moment depends on the boom position.

This makes it possible to minimize or reduce or lower a risk of the building material pump apparatus and/or thick matter pump apparatus tipping over or falling over and/or in particular therefore to increase safety when working with or during operation of the building material pump apparatus and/or thick matter pump apparatus, especially when adjusting the distributor boom. In addition or alternatively, this permits a maximized available working space, especially of the distributor boom, in particular where the working space may depend on the boom position.

In particular, the term “autonomous” may be used synonymously for the term “automatic”.

The distributor boom may be a building material distributor boom and/or thick matter distributor boom.

The building material pump apparatus and/or thick matter pump apparatus may be mobile, in particular movable, in particular a truck-mounted building material pump and/or thick matter pump.

The building material pump apparatus and/or thick matter pump apparatus may be designed for conveying building material and/or thick matter.

Building material may refer to mortar, cement, screed, concrete and/or plaster. In addition or alternatively, thick matter may refer to sludge.

At least the same tip position of the boom tip can be achieved by at least three, in particular at least ten, different boom positions.

A plurality of, in particular at least three, in particular at least ten, tip positions of the boom tip can be achieved, in particular at different times, by, in particular in each case, different boom positions of the distributor boom.

The boom tip may be a free end of the distributor boom.

The variable ascertaining the tip position may be a desired variable and/or ascertaining a desired tip position, in particular of the boom tip. In addition or alternatively, the variable may be a direction, in particular a desired direction, and/or a velocity, in particular a desired velocity, of a movement, in particular, a desired movement, of the boom tip. Further additionally or alternatively, the variable may be a travel command or travel order, in particular to achieve the tip position. Further additionally or alternatively, the variable may be predefined by an operator or user, in particular of the distributor boom and/or the building material pump apparatus and/or thick matter pump apparatus. Further additionally or alternatively, the method may comprise the step of: determining, in particular detecting, a stipulation of the variable, in particular by the operator.

An, in particular further, optimization criterion may be maintaining a distance by the distributor boom from at least one obstacle, such as, for example, a remaining part of the building material pump apparatus and/or thick matter pump apparatus and/or from a further distributor boom.

The tilting moment of the distributor boom may be in relation to a boom base or at a boom base, in particular at a four-point bearing, of the distributor boom. In addition or alternatively, the tilting moment may be caused by the boom position.

In a development of the invention, the distributor boom comprises or has a plurality of, in particular flexibly, adjustable boom joints. The boom position can be varied by a variable joint position combination or configuration of the boom joints. In particular, at least the same tip position can be achieved by different joint position combinations, in particular of the boom joints. In particular, the boom joints have different adjustment ranges, in particular different values of the adjustment ranges. The step comprises: determining, in particular automatically determining, and setting, in particular automatically setting, a joint position combination, in particular of at least one value of the joint position combination, in particular of the boom joints, depending on the predefined variable and on the basis of, in particular at least, the optimization criterion, in particular while taking into account the adjustment ranges. The tilting moment depends on the joint position combination. In particular, at least one of the boom joints may have, in particular may be, an articulated, rotational and/or sliding joint. In addition or alternatively, at least one of the adjustment ranges may have, in particular may be, an angular range. Further additionally or alternatively, at least one of the adjustment ranges may be defined, in particular delimited, by at least one, in particular mechanical, stop of at least one of the boom joints. Further additionally or alternatively, the building material pump apparatus and/or thick matter pump apparatus, in particular the distributor boom, may have a plurality of joint drives for adjusting the boom joints or varying or setting the joint position combination. Further additionally or alternatively, one of the boom joints may be at a non-free or fixed end or at the boom foot of the distributor boom.

In one refinement of the invention, the distributor boom is foldable in a rolling and/or Z-shaped manner, in particular foldable in a rolling Z-shaped manner, by means of the boom joints.

In a development of the invention, the distributor boom comprises or has a plurality of boom segments or boom sections which are adjustable, in particular with respect to one another and/or flexibly. The boom position is variable by a variable adjustment combination or configuration of the boom segments, in particular with respect to one another. In particular, at least the same tip position is achievable by different adjustment combinations, in particular of the boom segments with respect to one another. In particular, the boom segments have different masses, in particular different values of the masses, and/or different lengths, in particular different values of the lengths, and/or different center of gravity positions or centers of gravity, in particular values of the center of gravity positions. The step comprises: determining, in particular automatically determining, and setting, in particular automatically setting, an adjustment combination, in particular of at least one value of the adjustment combination, depending on the predefined variable and on the basis of, in particular at least, the optimization criterion, in particular while taking into account the masses and/or the lengths and/or the center of gravity positions. The tilting moment depends on the adjustment combination. In particular, the boom segments can be adjustable by means of the boom joints. In addition or alternatively, the building material pump apparatus and/or thick matter pump apparatus, in particular the distributor boom, may have a plurality of segment drives for adjusting the boom segments or for varying or setting the adjustment combination.

In particular, the step may comprise: determining, in particular searching for, depending on the variable ascertaining the tip position, in particular all of, the boom positions by which the tip position can be achieved. Determining on the basis of the determined boom positions, in particular all of the and/or associated tilting moments. Determining, in particular searching for, the most minimized or minimum tilting moment on the basis of the determined tilting moments. Determining the associated boom position on the basis of the determined most minimized tilting moment. Setting the determined associated boom position. In other words: determining and setting a boom position of a globally minimized or minimum tilting moment. In particular, this is independent of an actual boom position, in particular of the distributor boom.

In a development of the invention, the step comprises: determining, in particular automatically determining and/or searching for and/or calculating, and setting, in particular automatically setting, a change, in particular of the boom position, in particular directly and without a diversion, starting from, in particular at, an, in particular momentary or current, actual boom position, in particular of the distributor boom, in particular at least, on the basis of, in particular to, an, in particular greatest, minimization, in particular of the tilting moment, in particular directly and without a diversion, starting from, in particular at, an, in particular momentary or current, actual tilting moment of the distributor boom with respect to the support system. The actual tilting moment depends on the actual boom position. In other words: determining and setting a boom position to an, in particular closest, locally minimized or minimum tilting moment. This permits a local and/or, in particular therefore, simple and/or rapid minimization of the tilting moment, in particular while achieving and/or maintaining the tip position, in particular the desired tip position. In particular, the, in particular in this way, minimized tilting moment does not need to be or may not be a globally minimized or minimum tilting moment. In addition or alternatively, the wording "an, in particular steepest, drop or decrease" may be used synonymously for the wording "an, in particular greatest, minimization". Further additionally or alternatively, the method may be referred to as a gradient-based method. Further additionally or alternatively, the method may comprise the step of: determining, in particular detecting, the actual boom position.

In a development, in particular a refinement, of the invention, the step comprises: controlling, in particular automatically controlling and/or regulating, the boom position for a, in particular the, achieving and/or maintaining of the tip position, in particular the desired tip position, in particular starting from an, in particular momentary or actual, tip position of the distributor boom and/or during the determining and the setting of the change and/or as long as the actual tilting moment, if provided, is minimized. This permits the achieving and/or the maintaining of the tip position, in particular while minimizing the tilting moment. In particular, the method may comprise the step of: determining, in particular detecting, the actual tip position.

In a refinement of the invention, the step comprises: determining and setting the change and controlling, in particular regulating, the boom position by determining, in particular automatically determining and/or searching for and/or calculating, a solution, in particular a value of the solution, for a kinematic relationship, in particular at least, between minimizing the actual tilting moment and achieving and/or maintaining the tip position. This permits a link or combination, in particular of demands or functions, for minimizing the tilting moment and achieving and/or maintaining the tip position. In particular, the kinematic relationship can describe, in particular model, the minimization of the tilting moment and the achieving and/or the maintaining of the tip position. In addition or alternatively, the achieving and/or the maintaining of the tip position before, in particular further, minimizing the tilting moment may be a priority. In other words, the boom tip can achieve and/or maintain the tip position and the tilting moment does not need to achieve or may not achieve an, in particular closest, local minimum, in particular completely. Further additionally or alternatively, the kinematic relationship can take into account, in particular have, the adjustment ranges.

In a development of the invention, the support system is, in particular flexibly, adjustable. The method comprises or has the step of: locking, in particular automatically locking, boom positions, in particular values of the boom positions, and/or tilting moments, in particular values of the tilting moments, depending on a determined variable or a determined parameter, in particular of a determined value of the variable, ascertaining at least one variable support configuration or position, in particular at least one variable value of the support configuration and/or an actual support configuration, of the adjustable support system to counteract the tilting moment, in particular the actual tilting moment. This, in particular the adjustable support system, permits adaptation to an, in particular local, construction site situation, in particular to a small support surface. Additionally or alternatively, this permits, in particular, the locking of the boom positions and/or the tilting moments, depending on the determined variable ascertaining at least the variable support configuration, to minimize or reduce or lower a risk of the building material pump apparatus and/or thick matter pump apparatus tipping over or falling over, and/or, in particular therefore, to increase safety when working with or during operation of the building material pump apparatus and/or thick matter pump apparatus, especially when adjusting the distributor boom. Further additionally or alternatively, this, in particular the minimization of the tilting moment, permits a maximized available working space, especially of the distributor boom. In other words: this makes it possible for the operator or user without their own knowledge of the relationships between tilting moment or load moment and boom position, to operate the building material pump apparatus and/or thick matter pump apparatus, in particular the distributor boom, in the maximally possible range with a minimum support width. In particular, the support system can have supporting jibs, in particular adjustable in a support width and/or flexibly, in particular supporting legs. Additionally or alternatively, the method may comprise the step of: determining, in particular detecting, the support configuration, in particular the actual support configuration.

In a development of the invention, the distributor boom comprises or has an, in particular flexibly adjustable, conveyor line for conveying building material and/or thick matter. In particular, the conveyor line may have, in particular may be, a pipe.

The system according to the invention comprises or has a setting device. The setting device is designed or configured for, in particular, automatically setting an, in particular the, variable boom position of an, in particular the, adjustable distributor boom of an, in particular the, building material pump apparatus and/or thick matter pump apparatus. At least one same, in particular the same, tip position of an, in particular the, boom tip of the distributor boom can be achieved by different, in particular the different, boom positions. Furthermore, the setting device is designed or configured for, in particular, determining and setting an, in particular the, boom position depending on an, in particular the, predefined variable ascertaining an, in particular the, tip position and on the basis of an, in particular the, optimization criterion. The optimization criterion is a minimized, in particular the minimized, tilting moment of the distributor boom with respect to a, in particular the, support system of the building material pump apparatus and/or thick matter pump apparatus. The tilting moment depends on the boom position. The system can make possible the same advantages as the abovementioned or described method. In particular, the system, in particular the setting device, may be designed or configured for the, in particular automatic, carrying out of an, in particular the, abovementioned method. Additionally or alternatively, the system may have the distributor boom, in particular the building material pump apparatus and/or thick matter pump apparatus. Further additionally or alternatively, the setting device may be electric, hydraulic and/or pneumatic. In particular, the setting device may comprise a computing unit, in particular a processor, and/or a storage unit.

Further advantages and aspects of the invention emerge from the claims and from the following description of preferred exemplary embodiments of the invention, which are explained below with reference to the figures. In the figures:

DETAILED DESCRIPTION OF THE DRAWINGS

Figure 1:
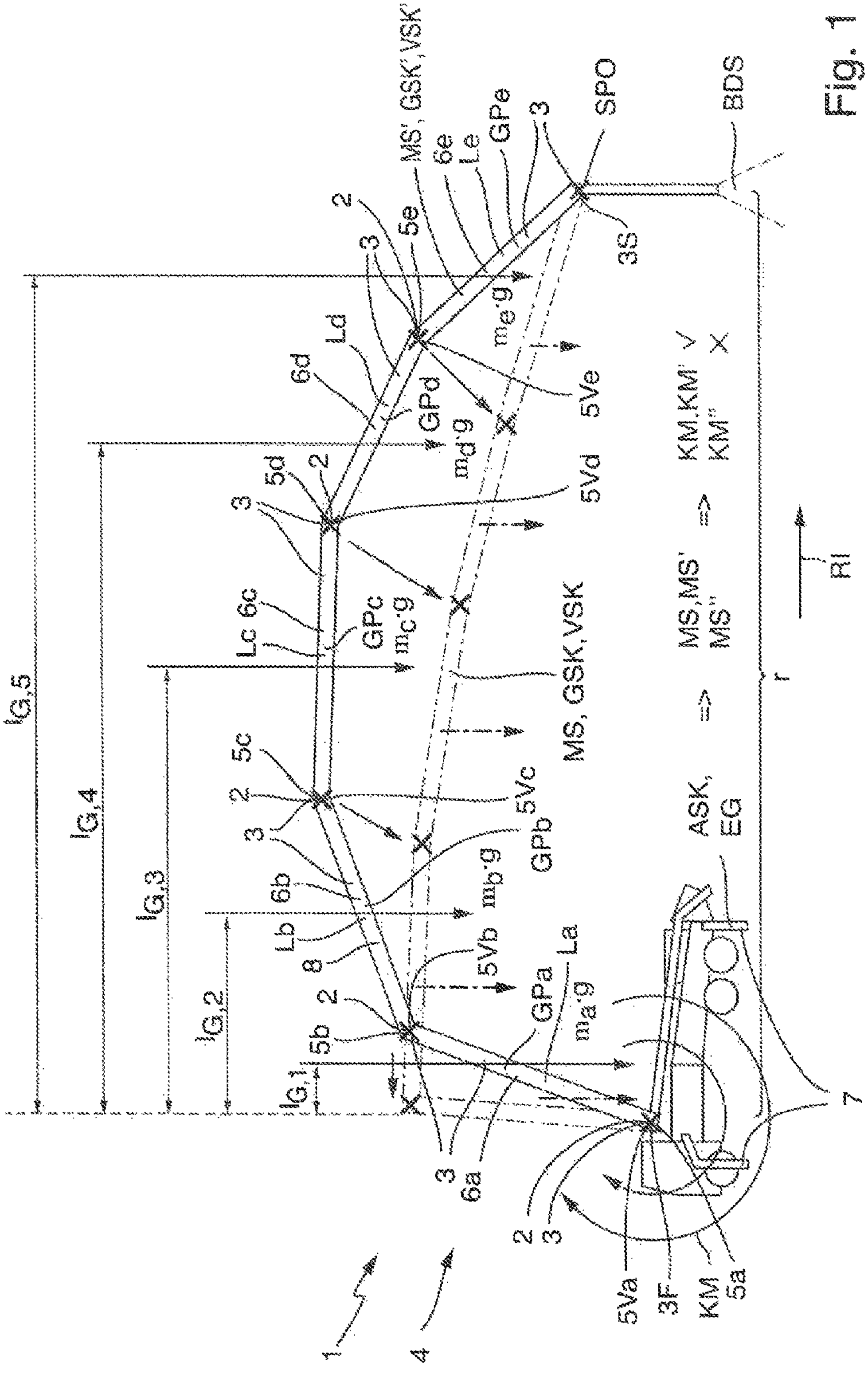
FIG. 1 schematically shows a system and a method according to an embodiment of the invention for automatically setting a variable boom position of an adjustable distributor boom of a building material pump apparatus and/or thick matter pump apparatus, in particular a relationship between the boom position and a tilting moment of the distributor boom.
Figure 2:
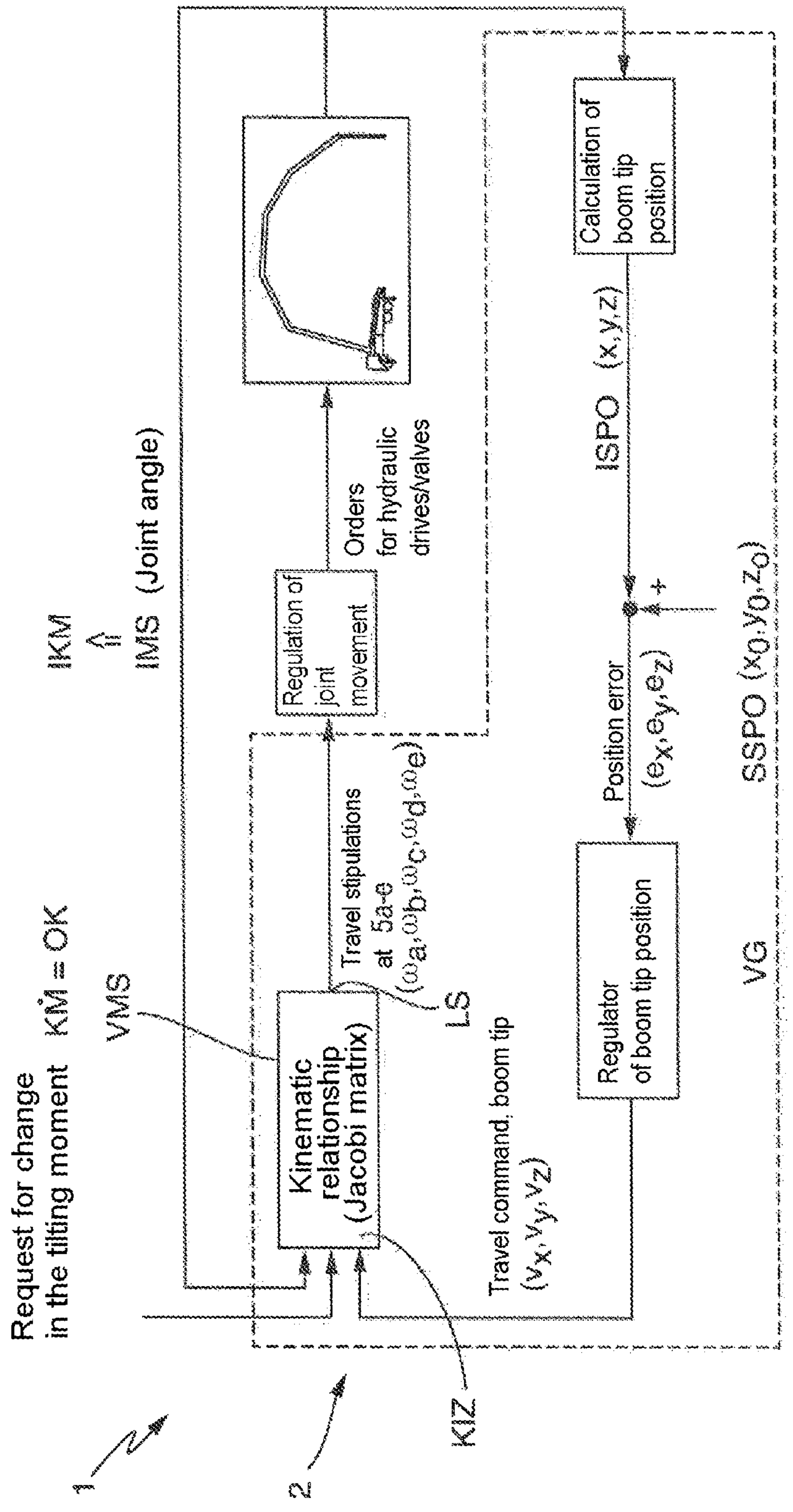
FIG. 2 schematically shows a block circuit diagram of the system and method of FIG. 1, in particular for minimizing the tilting moment.
Figure 3:
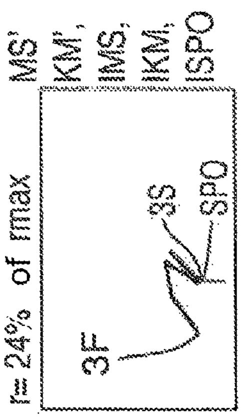
FIGS. 3 to 10 schematically show examples of the functioning of the system and the method of FIG. 1.
Figure 4:
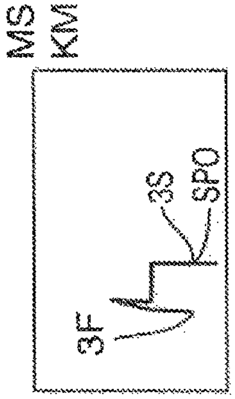
Figure 5:
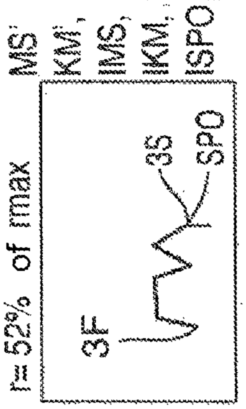
Figure 6:
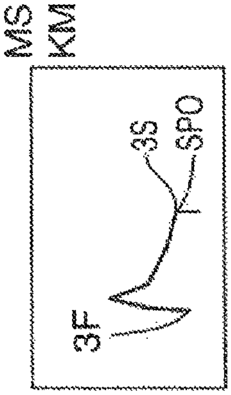
Figure 7:
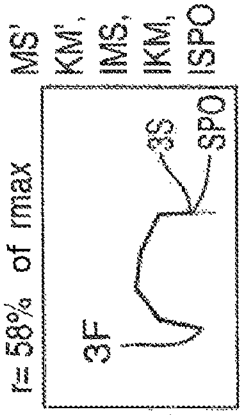
Figure 8:
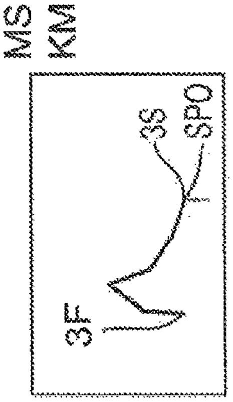
Figure 9:
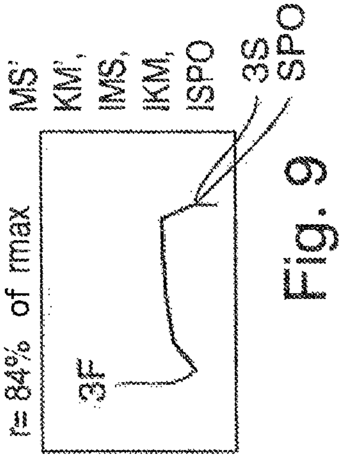
Figure 10:
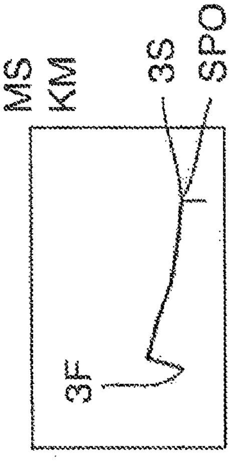

FIGS. 1, 2, and 3 to 10 show a system 1, in particular designed having a setting device 2, and a method for automatically setting a variable boom position MS of an adjustable distributor boom 3 of a building material pump apparatus and/or thick matter pump apparatus 4. At least one same tip position SPO of a boom tip 3S of the distributor boom 3 can be achieved by different boom positions MS, MS'.

Furthermore, the system 1, in particular the setting device 2, is designed for determining and setting a boom position MS depending on a predefined variable VG ascertaining a tip position SPO and on the basis of an optimization criterion OK, in particular determines and sets same.

The method moreover comprises the step of: determining and setting the boom position MS depending on the predefined variable VG ascertaining the tip position SPO and on the basis of the optimization criterion OK, in particular by means of the system 1, in particular the setting device 2.

The optimization criterion OK is a minimized tilting moment KM of the distributor boom 3 with respect to a support system 7 of the building material pump apparatus and/or thick matter pump apparatus 4, in particular a boom foot 3F of the distributor boom 3. The tilting moment KM depends on the boom position MS.

In the exemplary embodiment shown, the system 1 has the distributor boom 3, in particular the building material pump apparatus and/or thick matter pump apparatus 4.

In detail, the distributor boom 3 has a plurality of adjustable boom joints 5*a*, 5*b*, 5*c*, 5*d*, 5*e*. The boom position MS is variable by a variable joint position combination GSK of the boom joints 5*a-e*. The same tip position SPO can be achieved by different joint position combinations GSK, GSK'. In particular, the boom joints 5*a*, 5*b*, 5*c*, 5*d*, 5*e* have different adjustment ranges 5Va, 5Vb, 5Vc, 5Vd, 5Ve. The step comprises: determining and setting a joint position combination GSK depending on the predefined variable VG and on the basis of the optimization criterion OK, in particular while taking into account the adjustment ranges 5Va-e, in particular by means of the system 1, in particular the setting device 2. The tilting moment KM depends on the joint position combination GSK.

In detail, the distributor boom 3 is foldable in a rolling and/or Z-shaped manner, in particular foldable in a rolling Z-shaped manner, by means of the boom joints 5*a-e*.

Furthermore, the distributor boom 3 has a plurality of boom segments 6*a*, 6*b*, 6*c*, 6*d*, 6*e* which are adjustable, in particular with respect to one another. The boom position MS is variable by a variable adjustment combination VSK of the boom segments 6*a-e*, in particular with respect to one another. The same tip position SPO is achievable by different adjustment combinations VSK, VSK'. In particular, the boom segments 6*a*, 6*b*, 6*c*, 6*d*, 6*e* have different masses ma, mb, mc, md, me and/or different lengths La, Lb, Lc, Ld, Le and/or different center of gravity positions GPa, GPb, GPc, GPd, GPe. The step comprises: determining and setting an adjustment combination VSK depending on the predefined variable VG and on the basis of the optimization criterion OK, in particular while taking into account the masses ma-e and/or the lengths La-e and/or the center of gravity positions GPa-e, in particular by means of the system 1, in particular the setting device 2. The tilting moment KM depends on the adjustment combination VSK.

In the exemplary embodiment shown, the distributor boom 3 has five adjustable boom joints 5*a-e*. In alternative exemplary embodiments, the distributor boom may have at least three boom joints.

In addition, in the exemplary embodiment shown, the distributor boom 3 has five boom segments 6*a-e*. In alternative exemplary embodiments, the distributor boom may have at least three boom segments.

By way of background: a boom joint and/or a boom segment allow/allows movement of the boom tip. Two boom joints and/or two boom segments allow a free movement of the boom tip, in particular where height and radius, especially within certain limits, are independent of each other. At least three boom joints and/or at least three boom segments allow free movement of the boom tip and setting of the boom position via at least one degree of freedom. In other words: N boom joints and/or N boom segments, where N>=three, allow free movement of the boom tip and setting of the boom position via N–two degrees of freedom.

Furthermore, in the exemplary embodiment shown, a radius or a distance r and/or a direction or an angle RI of the distributor boom 3, in particular its boom tip 3S, in particular with respect to its boom foot 3F and/or the support system 7, can be varied by the variable joint position combination GSK and/or the variable adjustment combination VSK.

In addition, the step comprises: determining and setting a change VMS starting from an actual boom position IMS on the basis of an, in particular greatest, minimization starting from an actual tilting moment IKM of the distributor boom 3 with respect to the support system 7, in particular by means of the system 1, in particular the setting device 2. The actual tilting moment IKM depends on the actual boom position IMS.

By way of background: the tilting moment KM, in particular the actual tilting moment IKM, is in particular a function of the tilting moment KM depending on the boom position MS, e.g.:

$$KM = g \cdot \sum_{i=1,a}^{N,e} l_{G,i} \cdot m_i,\ N \geq 3$$

$$g \ \ldots \text{ Earth acceleration } \frac{9.81\ \text{m}}{s^2}$$

$l_{G,i}$ ... Lever arm for the weight of boom segment $i$ $m_i$ ... mass of boom segment $i$ Lever arms of the boom segments 6*a-e* are dependent on the boom position MS, in particular the actual boom position IMS, e.g.:

$$l_{G,i} = r_i + L,\ x_{SP,i} \cdot \cos(\varphi_{R,i})$$

$$r_i \cdot = \sum_{j=1}^{i-1} l_j \cdot \cos(\varphi_{R,j}),\ r_{1,a} = 0$$

-continued $$l_{G,i} = L,\ x_{SP,i} \cdot \cos(\varphi_{R,i}) + \sum_{j=1}^{i-1} l_j \cdot \cos(\varphi_{R,j})$$

$$\varphi_{R,i} = \sum_{j=1}^{i} \varphi_{G,j}$$

φ . . . adjustment coordinate, in particular angle, of the boom joints 5*a-e*.

In particular, the greatest, minimization of the tilting moment KM, in particular starting from the actual tilting moment IKM, means e.g. derivation of the function of the tilting moment KM after the change VMS of the boom position MS, in particular the adjustment coordinate or the angle of the boom joints 5*a-e*, especially starting from the actual boom position IMS:

$$\dot{KM} = \frac{dKM}{dt} = \frac{\partial KM}{\partial \vec{\varphi}_G} \cdot \vec{\omega} = C,$$

where $$C < 0,\ \vec{\varphi}_G = \begin{pmatrix} \varphi_{G,1,a} \\ \vdots \\ \varphi_{G,N,e} \end{pmatrix},\ \vec{\omega} = \begin{pmatrix} \omega_{1,a} \\ \vdots \\ \omega_{N,e} \end{pmatrix} = \frac{d\vec{\varphi}_G}{dt}.$$

Determining, in particular ascertaining, velocities of the boom joints 5*a-e*, in particular only or purely, for minimizing the tilting moment KM is possible e.g. via pseudoinverse or inverse direct kinematics:

$$\vec{\omega}_{red} = \left(\frac{\partial KM}{\partial \vec{\varphi}_G}\right)^{+} \cdot C$$

The step also comprises: controlling, in particular regulating, the boom position MS for achieving and/or maintaining of the tip position SPO, in particular a desired tip position SSPO, in particular starting from an actual tip position ISPO, of the distributor boom 3 and/or during the determining and the setting of the change VMS and/or as long as the actual tilting moment IKM is minimized, in particular by means of the system 1, in particular the setting device 2.

By way of background: achieving and/or maintaining, in particular securing, the boom tip 3S e.g. via a regulator, in particular the setting device 2.

A deviation of the tip position SPO, in particular the actual tip position ISPO, from the desired tip position or the desired value SSPO results in a position error, e.g.:

$$\vec{e}_{SPO} = \vec{r}_{SPO,des} - \vec{r}_{SPO,act}$$

In order to minimize the position error, a movement of the boom tip 3S can or is intended to be initiated to the desired tip position SSPO, e.g. via a simple proportional rule law:

$$\vec{v}_{SPO} = k_p \cdot \vec{e}_{SPO}$$

An illustration of the velocities of the boom joints 5*a-e* is possible, for example, via the relationship:

$$\vec{v}_{SPO} = \frac{\partial \vec{r}_{SPO}}{\partial \vec{\varphi}_G} \cdot \vec{\omega}$$

In addition, the step comprises: determining and setting the change VMS and controlling, in particular regulating, the boom position MS by determining a solution LS for a kinematic relationship KIZ between minimizing the actual tilting moment IKM and achieving and/or maintaining the tip position SPO, in particular by means of the system 1, in particular the setting device 2.

By way of background: the last-mentioned function or demand can be combined with minimizing the tilting moment KM, in particular of this function or demand, e.g. by the vector equation:

$$\begin{pmatrix} C \\ \vec{v}_{SPO} \end{pmatrix} = \begin{pmatrix} \frac{\partial KM}{\partial \vec{\varphi}_G} \\ \frac{\partial \vec{r}_{SPO}}{\partial \vec{\varphi}_G} \end{pmatrix} \cdot \vec{\omega}$$

in particular to form a combined Jacobi matrix, in particular composed of, in particular, the function, the change in the tilting moment and, in particular, the function, a movement of the boom tip, or to form the kinematic relationship KIZ.

$$\begin{pmatrix} C \\ \vec{v}_{SPO} \end{pmatrix} = \begin{pmatrix} \frac{\partial KM}{\partial \vec{\varphi}_G} \\ \frac{\partial \vec{r}_{SPO}}{\partial \vec{\varphi}_G} \end{pmatrix} \cdot \vec{\omega}$$

For three boom segments, this kinematic relationship KIZ or this equation can be solved exactly. In general, it may be expedient to directly impose at least one additional demand on the velocities of the boom joints 5*a-e*. This can either be used to move as efficiently as possible, such as:

$$\|\vec{\omega}\|_2 = \min$$

or also to take into account at least one adjustment range, in particular all of the adjustment ranges 5Va-e. In order to integrate the efficiency of the method in the consideration, the demand may be used, for example:

$$\vec{\omega}_{gef} = \vec{0}$$

In order to take into account at least one adjustment range, in particular all of the adjustment ranges 5Va-e, a travel command or a motion command into the, in particular associated, adjustment range 5Va-e can be requested, e.g. depending on a joint position GS of one of the boom joints 5*a-e*. If, for example, the angle of the first boom joint 5*a*, in particular at the boom foot 3F, is close to a limit value, it is also possible to request, for example:

$$\omega_{1,gef} = D$$

in particular where D<0 in the vicinity of an upper limit value and/or D>0 in the vicinity of a lower limit value.

The relationship between the vector of the requested velocities of the boom joints 5*a-e* can be represented, for example, via the unit matrix:

$$\vec{\omega}_{gef} = \begin{pmatrix} \omega_{1,gef} \\ \vdots \\ \omega_{N,gef} \end{pmatrix} = \begin{pmatrix} 1 & 0 & \ddots \\ 0 & \ddots & 0 \\ \ddots & 0 & 1 \end{pmatrix} \cdot \vec{\omega} = E_N \cdot \vec{\omega}$$

This additional demand or condition or function results in the kinematic relationship KIZ, in particular in the overall relationship, or the combined Jacobi matrix:

$$\begin{pmatrix} C \\ \vec{v}_{SPO} \\ \vec{\omega}_{gef} \end{pmatrix} \approx \begin{pmatrix} \frac{\partial KM}{\partial \vec{\varphi}_G} \\ \frac{\partial \vec{r}_{SPO}}{\partial \vec{\varphi}_G} \\ E_N \end{pmatrix} \cdot \vec{\omega}$$

This kinematic relationship KIZ represents an overdetermined system of equations, which in general cannot be solved exactly. Instead, for example, the best solution LS of this system of equations can be determined in terms of the least square error. For this purpose, a sum of the squares of the errors in the above equation can be minimized. The cost functional of this optimization is:

$$K(\vec{\omega}) = \left( \begin{pmatrix} C \\ \vec{v}_{SPO} \\ \vec{\omega}_{gef} \end{pmatrix} - \begin{pmatrix} \frac{\partial KM}{\partial \vec{\varphi}_G} \\ \frac{\partial \vec{r}_{SPO}}{\partial \vec{\varphi}_G} \\ E_N \end{pmatrix} \cdot \vec{\omega} \right)^T \cdot W \cdot \left( \begin{pmatrix} C \\ \vec{v}_{SPO} \\ \vec{\omega}_{gef} \end{pmatrix} - \begin{pmatrix} \frac{\partial KM}{\partial \vec{\varphi}_G} \\ \frac{\partial \vec{r}_{SPO}}{\partial \vec{\varphi}_G} \\ E_N \end{pmatrix} \cdot \vec{\omega} \right)$$

In order to be able to prioritize the individual components of the method or process (minimizing the tilting moment KM, achieving and/or maintaining the desired tip position SSPO and implementing the requested, in particular different, speeds of the boom joints 5*a-e*), these can be taken into account with different weightings in the cost functional K. The diagonal matrix W may have, in particular contain, these weightings.

Since this is a linear relationship, it can take place e.g. directly via a general least-squares solution:

$$\vec{\omega}_{opt} = \left( \begin{pmatrix} \frac{\partial KM}{\partial \vec{\varphi}_G} \\ \frac{\partial \vec{r}_{SPO}}{\partial \vec{\varphi}_G} \\ E_N \end{pmatrix}^T \cdot W \cdot \begin{pmatrix} \frac{\partial KM}{\partial \vec{\varphi}_G} \\ \frac{\partial \vec{r}_{SPO}}{\partial \vec{\varphi}_G} \\ E_N \end{pmatrix} \right)^{-1} \cdot \begin{pmatrix} \frac{\partial KM}{\partial \vec{\varphi}_G} \\ \frac{\partial \vec{r}_{SPO}}{\partial \vec{\varphi}_G} \\ E_N \end{pmatrix}^T \cdot W \cdot \begin{pmatrix} C \\ \vec{v}_{SPO} \\ \vec{\omega}_{gef} \end{pmatrix}$$

Alternatively, in particular and advantageously in this or the present case, the minimization of the cost functional on the basis of its gradient: may also be undertaken iteratively:

$$\frac{\partial K(\vec{\omega})}{\partial \vec{\omega}} = -2\begin{pmatrix} \frac{\partial KM}{\partial \vec{\varphi}_G} \\ \frac{\partial \vec{r}_{SPO}}{\partial \vec{\varphi}_G} \\ E_N \end{pmatrix}^T \cdot W \cdot \left( \begin{pmatrix} C \\ \vec{v}_{SPO} \\ \vec{\omega}_{gef} \end{pmatrix} - \begin{pmatrix} \frac{\partial KM}{\partial \vec{\varphi}_G} \\ \frac{\partial \vec{r}_{SPO}}{\partial \vec{\varphi}_G} \\ E_N \end{pmatrix} \cdot \vec{\omega} \right)$$

$$\vec{\omega}_{opt,i+1} = \vec{\omega}_{opt,i} + \lambda \cdot \frac{\partial K(\vec{\omega})}{\partial \vec{\omega}} \Big|_{\vec{\omega}=\vec{\omega}_{opt}},$$

with the increment parameter λ and a start value $\vec{\omega}_{opt,0}$ that can be simply selected equal to the zero vector in the simplest case.

Furthermore, the support system 7 is adjustable. The method comprises the step of: locking boom positions MS" and/or tilting moments KM" depending on a determined variable EG ascertaining at least one variable support configuration ASK of the adjustable support system 7 to counteract the tilting moment KM, in particular by means of the system 1, in particular the setting device 2.

In addition, the distributor boom 3 has, in particular supports, a conveyor line 8 for conveying building material and/or thick matter BDS.

In addition, the distributor boom 3 has an, in particular freely suspended, end hose.

In particular, the end hose can be taken into account in the mass me and/or the center of gravity position GPE of the, in particular last, boom segment 6*e*.

As the exemplary embodiments shown and explained above make clear, the invention provides an advantageous method for automatically setting a variable boom position of an adjustable distributor boom of a building material pump apparatus and/or thick matter pump apparatus and an advantageous system, in particular that has respectively improved properties.

In other words, the method and/or the system for automatically minimizing the tilting moment allow/allows the operator or user to make maximum use of the working space when the working space is opened up on the basis of the actual tilting moment. When the limit of the opened-up working space is reached, the distributor boom, by simple pressing of a button, can be readjusted in such a way that the actual tilting moment is minimized, as a result of which further parts of the working space are opened up. This makes it possible for the operator or user without their own knowledge of the relationships between tilting moment and boom position, to operate the building material pump apparatus and/or thick matter pump apparatus in the maximally possible range with a minimum support width.

The invention claimed is:

1. A method for automatically setting a variable boom position of an adjustable distributor boom of a building material pump apparatus and/or thick matter pump apparatus, wherein at least one same tip position of a boom tip of the distributor boom is achievable by different boom positions, the method comprising:

determining and setting a boom position depending on a predefined variable ascertaining a tip position and based on an optimization criterion, wherein the optimization criterion is a minimized tilting moment of the distributor boom with respect to an adjustable support system of the building material pump apparatus and/or thick matter pump apparatus, and the tilting moment is dependent on the boom position; and the method further comprising:

locking boom positions and/or tilting moments depending on a determined variable ascertaining at least one variable support configuration of the adjustable support system to counteract the tilting moment.

2. The method as claimed in claim 1, wherein the distributor boom has a plurality of adjustable boom joints, wherein the boom position is variable by a variable joint position combination of the boom joints, wherein the same tip position is achievable by different joint position combinations, wherein the method further comprises:

determining and setting a joint position combination depending on the predefined variable and based on the optimization criterion.

3. The method as claimed in claim 2, wherein the plurality of boom joints have different adjustment ranges, and wherein the tilting moment depends on the joint position combination while factoring into account the different adjustment ranges.

4. The method as claimed in claim 2, wherein the distributor boom is foldable in a rolling and/or Z-shaped manner by way of the plurality of boom joints.

5. The method as claimed in claim 1, wherein the distributor boom has a plurality of boom segments which are adjustable with respect to one another, wherein the boom position is variable by a variable adjustment combination of the boom segments, wherein the same tip position is achievable by different adjustment combinations, wherein the method further comprises:

determining and setting an adjustment combination depending on the predefined variable and based on the optimization criterion.

6. The method as claimed in claim 5, wherein the plurality of boom segments have different masses, different lengths, and/or different center of gravity positions, and wherein the tilting moment depends on the adjustment combination while factoring into account the different masses, the different lengths, and/or the different center of gravity positions.

7. The method as claimed in claim 1, wherein the method further comprises:

determining and setting a change, starting from an actual boom position, based on a greatest minimization starting from an actual tilting moment of the distributor boom with respect to the support system, wherein the actual tilting moment depends on the actual boom position.

8. The method as claimed in claim 7, wherein the method further comprises:

controlling the boom position for achieving and/or maintaining of the tip position starting from an actual tip position of the distributor boom and/or during the determining and the setting of the change and/or as long as the actual tilting moment is minimized.

9. The method as claimed in claim 8, wherein the method further comprises:

determining and setting the change and controlling the boom position by determining a solution for a kinematic relationship between minimizing the actual tilting moment and achieving and/or maintaining the same tip position.

10. The method as claimed in claim 1, wherein the distributor boom has a conveyor line for conveying building material and/or thick matter.

11. A system, comprising:

a setting device, wherein the setting device is designed for automatically setting a variable boom position of an adjustable distributor boom of a building material pump apparatus and/or thick matter pump apparatus, wherein at least one same tip position of a boom tip of the distributor boom is achievable by different boom positions, and wherein the setting device is further designed for determining and setting a boom position depending on a predefined variable ascertaining a tip position and based on an optimization criterion, wherein the optimization criterion is a minimized tilting moment of the distributor boom with respect to an adjustable support system of the building material pump apparatus and/or thick matter pump apparatus, and the tilting moment is dependent on the boom position, and wherein the setting device is further designed for locking boom positions and/or tilting moments depending on a determined variable ascertaining at least one variable support configuration of the adjustable support system to counteract the tilting moment.

* * * * *